Patented May 3, 1949

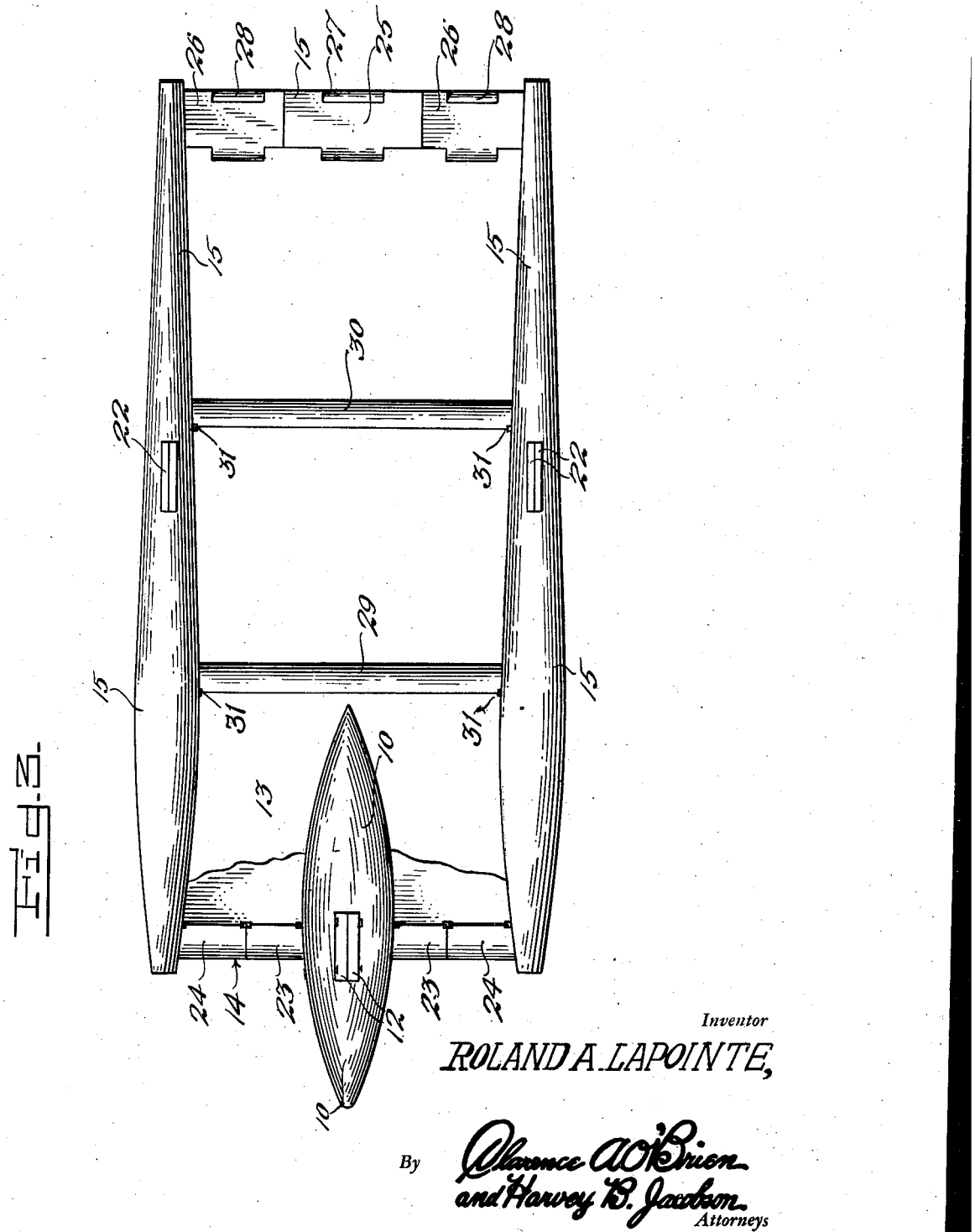

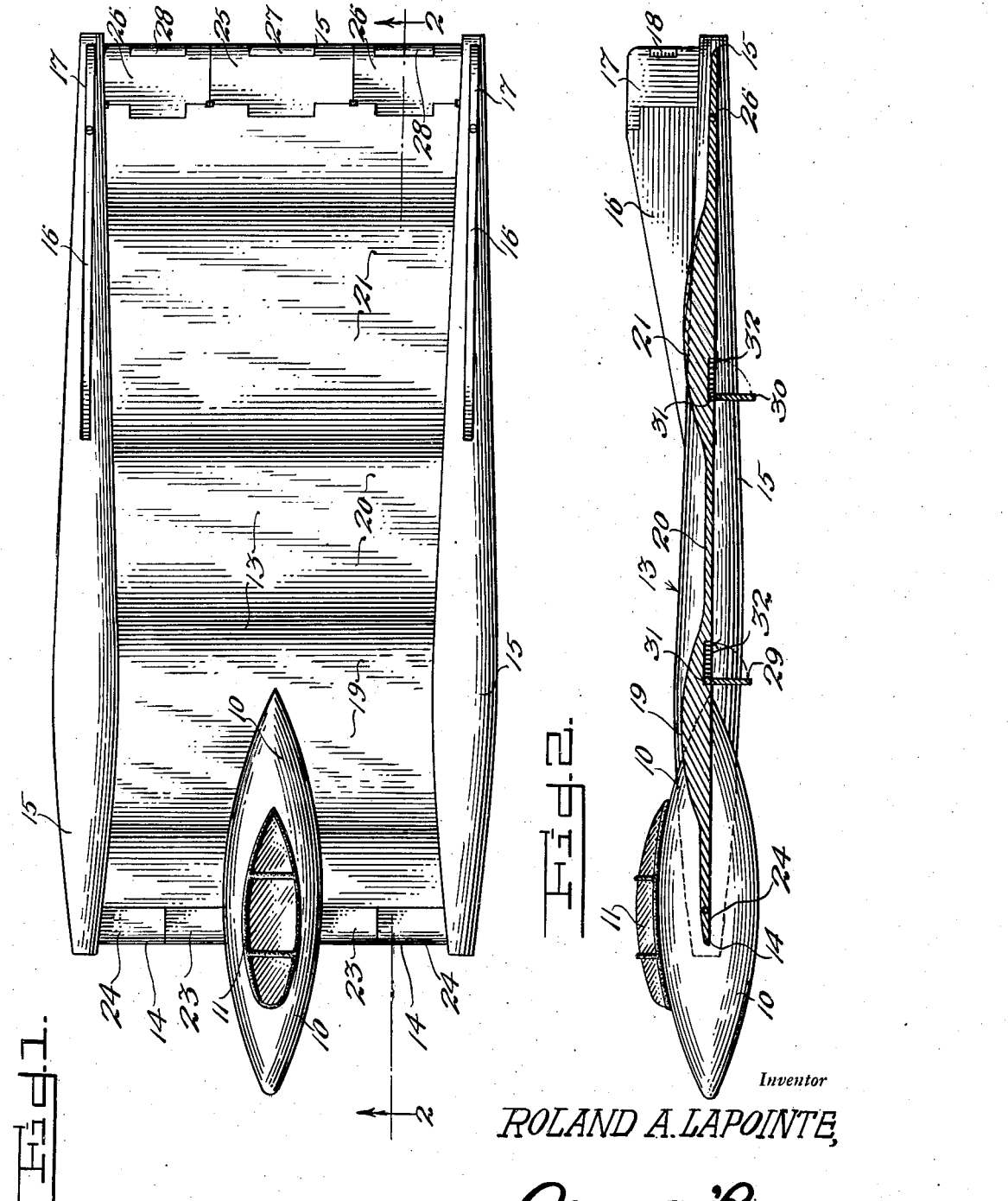

2,468,883

UNITED STATES PATENT OFFICE 2,468,883

AIRPLANE WING

Roland A. La Pointe, Bangor, Maine

Application January 3, 1946, Serial No. 638,765

5 Claims. (Cl. 244—13)

This invention relates to an airplane or Siamese wing of narrow construction and design which increases the lift per square foot as compared with a wing of conventional or airfoil design and at the same time produces a comparatively small amount of drag on the aeroplane.

Another object of the invention is to provide a Siamese or airplane wing which is relatively narrow and long, so that the fuselage or body of the plane may be mounted centrally and longitudinally relative thereto at the front thereof and extended forwardly of the wing to give the pilot better visibility and search view.

Another object of the invention is to provide a wing which with the assistance of the control surfaces on the leading edge thereof has greater maneuverability and is not hampered by the partial vacuum at the trailing edge of the wing which occurs at exceedingly high speeds and also elevators which are removed from the compressibility wake of the wing in a plane construction, and provided with a very thin leading edge which prevents to a great extent molecules of air from piling up in front of the wing at a great speed which causes shock waves.

Another object of the invention is to provide a type of wing construction which makes the plane compact and with small frontal area so that it does not offer much air resistance, its leading edge being only about one-third as wide as an ordinary wing of the same area of conventional type. Also, since there is no separate horizontal stabilizer, a considerable percentage of the drag is eliminated and the elevators and ailerons on the leading edge of the wing as well as the trailing edge, are arranged to operate in coordination with the elevator provided at the trailing end together with ailerons on the trailing edge of the wing.

Other objects and advantages reside in the details of construction and operation as more fully hereinafter described and claimed, reference being had to the accompanying drawings forming part hereof, wherein like numerals refer to like parts throughout, and in which:

Figure 1 is a plan view of a plane equipped with the improved airplane or Siamese wing.

Figure 2 is a sectional view taken on the line 2—2 of Figure 1.

Figure 3 is a bottom view of the plane.

Referring to the drawings in detail, in which like reference characters designate corresponding parts throughout the several views, the fuselage or cabin is indicated at 10, having the transparent top portion 11 which may be openable or removable, to give visibility. The fuselage is streamlined or oppositely tapered formation somewhat lenticular in shape and provided with trap doors 12 at the bottom and intermediate portion for enclosing front retractable landing gear in a housing formed in the bottom of the fuselage to which the trap doors are hinged and operable in the ordinary manner. The fuselage is shown extending centrally and longitudinally of and projecting from the forward edge of the wing 13, constituting the leading edge 14 thereof, while the trailing edge of the relatively long wing which is comparatively narrow, is indicated at 15'.

At the sides of the wing 13, the latter is provided with jet propulsion means in the form of long cigar-shaped nacelles 15 upon the top portions centrally and longitudinally of which, vertical stabilizer fins 16 are provided and at the rear thereof, rudder 17 having rudders 18 at their rear or trailing edges. The wing is shown of double cambered cross-section, and in addition to the sharp leading and trailing edges, as particularly shown in Figure 2 of the drawings, is provided with a flat or plain bottom surface and an undulated top surface having an upwardly arched or convexed thickened transverse portion 19, a thin portion 20 in the rear thereof also transversely, and another portion 21 corresponding substantially to the portion 19 also running transversely in rear of the thin portion 20 and tapering to the rear edge as the portion 19 tapers to the portion 20 intermediately of the portions 19 and 21 providing desirable lifting surfaces. Also, at the bottom, the nacelles 15 longitudinally at the sides are provided with similar landing gear housings and trap doors 22 corresponding to the ones 12 at the front, the nacelles 15 accommodating the retractable landing gears. This arrangement gives a three-point landing for the plane.

At the forward or leading edge of the plane 13, the latter is provided on each side of the fuselage 10, with front elevators 23 well known in the art, and outwardly thereof and between the nacelles 15 with front ailerons 24, while at the rear or trailing edge, the plane 13 is provided with a central or rear elevator 25 and rear ailerons 26 outwardly thereof extending to the nacelles 15 at their rear long tapered ends. It should be noted that the nacelles 15 are larger near the front and have a longer taper at their rear portions than at their forward portions. The pivoted rear elevator 25 is provided with a trim tab 27 and the ailerons 26 are provided with corresponding trim tabs 28 as well known in the art.

Beneath the bottom of the wing or plane of the aircraft, the latter is provided with spaced transverse flaps 29 and 30 placed equidistantly from the front and rear edges and from each other, fulcrumed or hinged at their top edges as indicated at 31, so as to move into recesses or depressions 32 in the bottom surfaces of the wing. These two full span flaps on the underside of the wing, act as brakes either in diving or for a slow and safe landing.

Thus, it will be seen that the double cambered wing will increase the lift per square foot as compared with a wing of conventional or airfoil design, and at the same time getting a comparatively small amount of drag resultant from said construction. With the assistance of the control surfaces on the leading edge of the wing, the maneuverability of the plane is not hampered by the partial vacuum at the trailing edge of the wing which occurs at exceedingly high speeds and also the elevators are removed from the compressibility wake of the wing. The very thin leading edge of the wing prevents, to a great extent, molecules of air from piling up in front of the wing at great speeds which cause shock waves.

The type of wing illustrated makes the plane compact and has a small frontal area so that it does not offer much air resistance. Its leading edge is only about one-third as wide as an ordinary wing of the same area and since there is no separate horizontal stabilizer, a considerable percentage of the drag is eliminated. The elevators and ailerons on the leading edge of the wing are arranged to operate in coordination with the elevator and ailerons on the trailing edge of the wing, this operating means being the same as corresponding devices on conventional planes or wings, such as the airfoil type.

In view of the foregoing description taken in conjunction with the accompanying drawings it it believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

What I claim is:

1. An aircraft including a low aspect ratio wing, and chordwise extending nacelles, enclosing propulsion means, mounted on each wing tip and coextensive therewith in a chordwise direction, said wing comprising a substantially continuous and flat lower surface, forward and rear cambered upper surfaces, and tapered leading and trailing edges, said cambered upper surfaces being arranged spaced from both tapered leading and trailing edges and spaced from one another in a chordwise direction.

2. The construction defined in claim 1, in combination with a hingedly mounted spanwise flap mounted on said lower flat wing surface adjacent the rear extremity of the forward cambered upper surface.

3. The construction defined in claim 1, in combination with a hingedly mounted spanwise flap mounted on said lower flat wing surface adjacent the rear extremity of the forward cambered upper surface, and a second hingedly mounted spanwise flap mounted on said lower flat wing surface adjacent the front extremity of the rear cambered upper surface.

4. The construction defined in claim 1, in combination with vertical stabilizer fins upon the top of the rear portions of said nacelles, and rudders hinged to the rear ends of said stabilizer fins.

5. The construction defined in claim 1, in combination with vertical stabilizer fins upon the top of the rear portions of said nacelles, and rudders hinged to the rear ends of said stabilizer fins, and elevators and ailerons hinged on said tapered leading and trailing edges.

ROLAND A. LA POINTE.

REFERENCES CITED

The following references are of record in the file of this patent:

UNITED STATES PATENTS

| Number | Name | Date |
|---|---|---|
| 1,095,952 | Arnoux | May 5, 1914 |
| 1,575,880 | Wall | Mar. 9, 1926 |
| 1,742,461 | Cuddy | Jan. 7, 1930 |
| 1,752,378 | Gobble | Apr. 1, 1930 |
| 2,380,535 | McDevitt | July 31, 1945 |
| 2,406,625 | Oglesby | Aug. 27, 1946 |

FOREIGN PATENTS

| Number | Country | Date |
|---|---|---|
| 24,822 | Great Britain | Oct. 30, 1912 |